US006134036A

United States Patent [19]
Andreozzi et al.

[11] Patent Number: 6,134,036
[45] Date of Patent: Oct. 17, 2000

[54] ADD/DROP MULTIPLEXER NODE

[75] Inventors: Paolo Andreozzi; Stefano Merli, both of Rome; Renato Norbiato, Anzio; Francesco Testa, Pomezia, all of Italy

[73] Assignee: Telefonaktiebolaget LM Ericsson, Stockholm, Sweden

[21] Appl. No.: 08/981,520

[22] PCT Filed: Jun. 20, 1996

[86] PCT No.: PCT/SE96/00813

§ 371 Date: Feb. 10, 1998

§ 102(e) Date: Feb. 10, 1998

[87] PCT Pub. No.: WO97/01897

PCT Pub. Date: Jan. 16, 1997

[30] Foreign Application Priority Data

Jun. 26, 1995 [SE] Sweden .................................. 9502311

[51] Int. Cl.[7] .................................................... H04J 14/02
[52] U.S. Cl. ............................ 359/127; 359/128; 385/17
[58] Field of Search ................................. 359/128, 124, 359/127, 119, 110; 385/17, 24

[56] References Cited

U.S. PATENT DOCUMENTS

| | | |
|---|---|---|
| 5,003,531 | 3/1991 | Farinholt et al. . |
| 5,327,427 | 7/1994 | Sandesara ................................. 370/222 |
| 5,442,623 | 8/1995 | Wu . |
| 5,617,233 | 4/1997 | Boncek .................................... 359/123 |
| 5,959,749 | 9/1999 | Danagher et al. ....................... 359/124 |

FOREIGN PATENT DOCUMENTS 0505062   9/1992   European Pat. Off. .

OTHER PUBLICATIONS

Huang et al., "A WDMA Ring Network With Holographic Wavelength–Selective Partial Demultiplexes" 1993 *Canadian Conference on Electrical and Computer Engineering*, II(36–77):1119–1121, (1993).

Wakabayashi et al., "A synchronous DS3 Add/Drop Multiplexer with Cross–Connect" IEEE Global Telecommunications Conference, pp. 1195–1199 (1986).

Fujimoto et al., "Broadband Subscriber Loop System Using Multi–Gigabit Intelligent Optical Shuttle Nodes" IEEE Global Telecommunications Conference, 3:1449–1454 (1987).

Wehrmann et al., "Fully Packaged, Integrated Optical, Acoustically Tunable Add/Drop Multiplexers in $LiNbO_3$", Proceedings $7^{th}$ European Conference on Integrated Optics, pp. 487–490 (1995).

Elrefaie, "Multiwavelength Survivable Ring Network Architectures", *ICC*, pp. 1245–1251 (1993).

*Primary Examiner*—Kinfe-Michael Negash
*Attorney, Agent, or Firm*—Burns, Doane, Swecker & Mathis, L.L.P.

[57] ABSTRACT

An add/drop multiplexer node in an optical network comprises an optical channel-selective switch. The switch is operable in bar and cross states and has a first input for the reception of optical multiplexed channels, a second input connected to an output on a line terminal associated with the node for adding channels, a first output, which is bar coupled to the first input and connected to a line terminal input for dropping channels and a second output, which is bar coupled to the second input. A predetermined number of channels to be dropped are selected and the channel-selective switch cross-couples non-selected channels from the first input to the second output.

16 Claims, 4 Drawing Sheets

ADD/DROP MULTIPLEXER NODE

This application is a 371 of PCT/SE96/00813 filed Jun. 20, 1996.

TECHNICAL FIELD

The present invention relates to a method of adding and dropping optical channels to and from a line terminal that is connected to an optical add/drop multiplexer node, an optical add/drop multiplexer node as well as to an optical network comprising at least one such optical add/drop multiplexer node.

STATE OF THE ART

There exist within the art nodes for the selective adding and dropping of a predetermined number of multiplexed channels from and to a line terminal, which is associated with the node. However, none of the existing nodes are completely optical, but have all, in case optical signal transmission lines are used, electrical/optical and optical/electrical interfaces. The adding and dropping of channels in these nodes takes place in the electrical part of the node. This naturally imposes a restraint on the speed with which signals can be transferred in such a system and on the compatibility of different transmission devices supporting different transfer modes within the same network structure. There therefore exists a need for such a node that selectively adds and drops a predetermined number of multiplexed channels optically.

There do exist nodes that have adding and dropping devices that are completely optical. These devices do however have a few limitations. One such device, which is called a SONET ADM (Add/Drop Mulitiplexer), can only add and drop one specific channel. If several channels are to be dropped, multiplexers and demultiplexers as well as several such SONET ADMs have to be added to the node, which is a complicated way of performing selective adding and dropping of a predetermined number of channels.

Another problem with such nodes is that if several nodes are coupled together in cascade, the spontaneous emission from optical amplifiers that are required in each node tends to get high and become a serious problem. This is especially the case if the network is in the form of a ring.

In the article "Multiwavelength Survivable Ring Network Architectures" of A. F. Elrefaie in Proceedings of ICC'93, February 1993, pp 1245–1251, there is described SONET ADMs and the article further suggests that an acousto-optical tunable filter can be used for the adding and dropping of optical wavelength division multiplexed (WDM) channels. No real node structure is however described. This article also suggests the use of a grating based device for said dropping and adding of channels. In case the grating based device is used, multiplexers and demultiplexers are required to effect the dropping and adding effect. The acousto-optical filter requires an optical splitter at its input and an optical combiner at its output in order to selectively drop and add a predetermined number of channels, which two latter components are not described in the article. A node with such a structure would have a receiver connected to the splitter and a transmitter to the combiner. This combination of devices rejects the noise caused by spontaneous emission from optical amplifiers in the network. It does however have a few drawbacks. One drawback is that the filtering function is not very selective so that about half the input power is filtered away. Another problem with this arrangement is that it has a relatively high level of crosstalk.

Yet another problem is the polarization mode dispersion effect, which imposes a restraint on a network using this arrangement. Because of this effect a channel that is added to the network at one node cannot be transported to node that is located more than three nodes away from said one.

SUMMARY OF THE INVENTION

The present invention solves the problem of selectively adding and dropping, in a node, a predetermined number of channels from and to a line terminal that is associated with the node without the use of multiplexers, demultiplexers or additional optical combiners and splitters.

According to the invention this problem is solved through the use of a channel-selective switch in an optical add/drop multiplexer node. In the channel-selective switch, which operates in bar and cross states, channels are received on a is first input of the channel-selective switch and channels that are selected to be added from a line terminal associated with the add/drop multiplexer node are received on a second input and bar coupled to a second output. Channels selected to be dropped are bar coupled from said first input to a first output and channels not selected to be dropped are cross coupled to the second output.

One object of the present invention is to provide a method of selectively adding and dropping a predetermined number of channels to and from a line terminal without the use of multiplexers and demultiplexers or additional optical combiners and splitters.

This object is achieved through receiving a number of channels in the node, selecting which channels are to be dropped from and added to the node, dropping and adding the selected channels with the use of a channel-selective switch, which operates in bar and cross states, and passing the non-selected channels through the node. The non-selected channels are cross coupled in the channel-selective switch from a first input to a second output. The non-selected channels and added channels are fed to a following node from the second output.

Another object of the present invention is to provide a method that also provides output channels from the node that have substantially the same power levels.

This object is achieved through equalization of the power levels of the non-selected channels and adding the selected channels with the equalized power level.

Another object of the present invention is to provide an optical add/drop multiplexer node for communication with other optical nodes as well as an optical system including at least one such optical add/drop multiplexer node, which node is able to add and drop channels to and from a line terminal without the use of multiplexers and demultiplexers or additional optical combiners and splitters.

This object is achieved through an optical add/drop multiplexer node and an optical system including such an add/drop multiplexer node, which comprises a channel-selective switch. The channel-selective switch is operable in bar and cross states and has a first input connected to a first input of the node, a second input connected to an output on a line terminal that is associated with the node, a first output, which is bar coupled to the first input and connected to an input on the line terminal and a second output, which is bar coupled to the second input and connected to a first output of the node. The channel-selective switch is arranged to cross couple, at least partially, a predetermined number of channels that are received on the first input to the second output and to bar couple the other channels received on the first input to the first output as well as channels coming from the line terminal from the second input to the second output.

Yet another object of the present invention is to provide an optical add/drop multiplexer node as well as an optical system comprising such a node, where channels output from the node have substantially the same power levels.

This object is achieved through the use of an add/drop multiplexer node in which a light detection means is optically connected between the first output of the channel-selective switch and the output of the node, for the detection of channel power variations, which light detection means is also connected to a control means. The control means, which also is connected to the channel-selective switch, is arranged to send information to said channel-selective switch concerning choice of channels to be cross coupled and concerning equalization of said cross coupled channels.

One advantage of the invention is that any of a number of existing channels can be chosen to be dropped to and added from a line terminal at a node. Because of this channels can be rerouted because of traffic variations. Another advantage of the invention is that the noise level in the node because of amplifier spontaneous emission and crosstalk is substantially lowered, especially when the invention is used in a ring configured network. Another advantage is that the problem of polarization mode dispersion is alleviated, so that channels added to a network at one node can be dropped at another node that is placed more than three nodes away from said one node.

BRIEF DESCRIPTION OF THE DRAWINGS

The invention will be described in the following in a nonlimiting way with reference to the accompanying drawings, in which.

PREFERRED EMBODIMENT OF THE INVENTION

Figure 1:
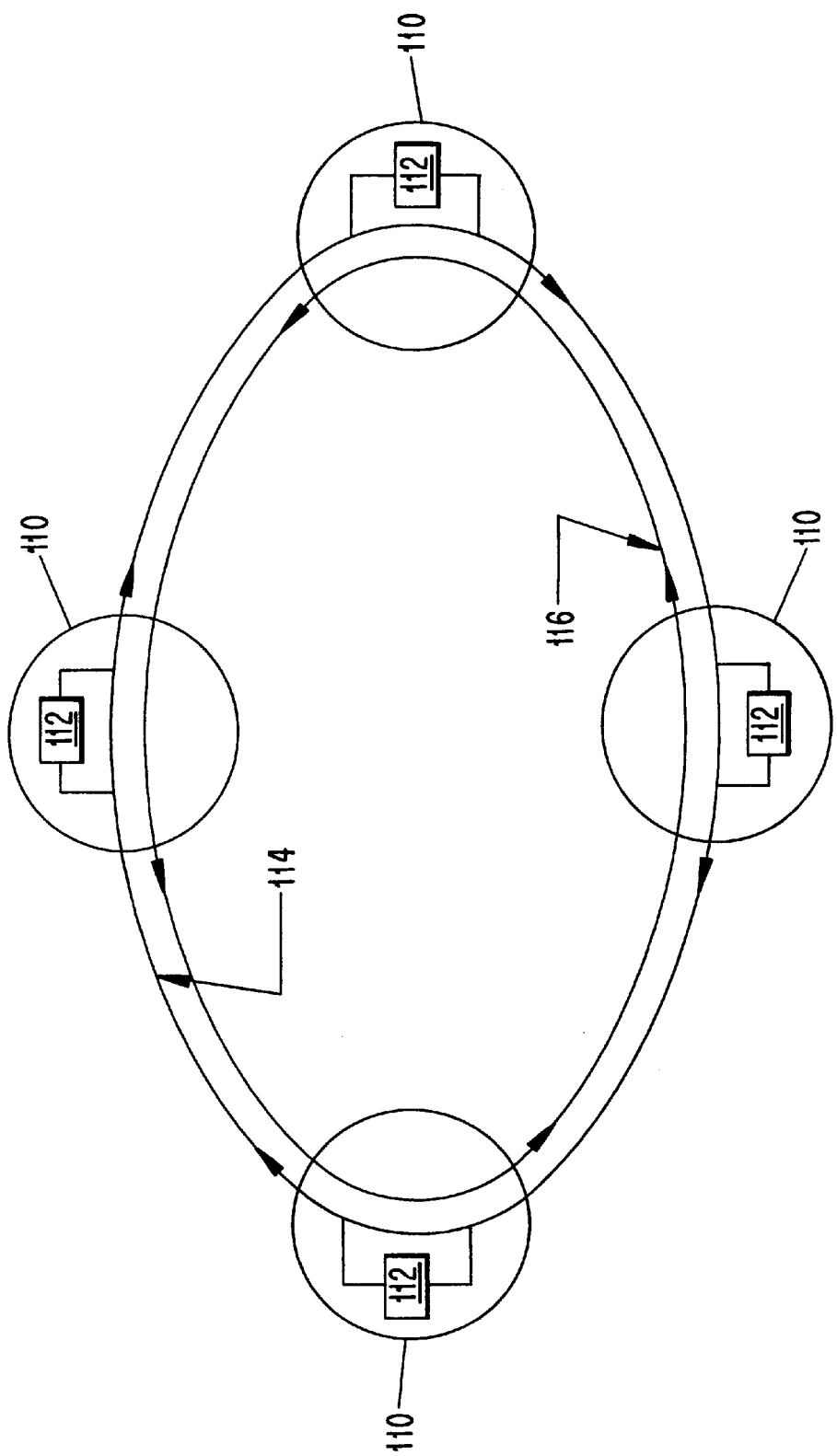
FIG. 1 shows schematically nodes according to the invention coupled in a ring-shaped configuration.

A preferred embodiment of the present invention will now be described in detail. FIG. 1 shows a schematic diagram of a ring shaped optical network according to the invention. The present invention is however not limited to this type of network configuration, but can just as well be used in a bus shaped or mesh shaped network as well as in other types of networks. The network in FIG. 1 is termed a self-healing ring network. The network according to FIG. 1 consists of four nodes 110, which all are add/drop multiplexer nodes according to the invention. Two circular optical fibers 114 and 116 run through each node 110. These fibers are shown in the form of a first ring 114 encircling a second ring 116. A line terminal 112 in each node 110 has two connections with the first ring 114, one for adding and the other for dropping traffic. The first ring 114 is termed a working outer ring. The second ring 116 is termed a protection inner ring. In parts of the fibers, between the nodes, amplifiers are provided, which are shown as arrows. This figure is of course a highly schematic one and is only used in order to show the principle of operating a network.

The network structure is functioning in the following way. Traffic is sent to and from the nodes on the working outer ring 114, in the direction of the arrows, on optical channels that are dedicated to the nodes. All the traffic is sent over the outer working ring 114 when the network is working properly. If however a fault should occur on the network, such as a fault on a node or a cable break in the working outer ring 114 and/or the protection inner ring 116, traffic is folded to the protection inner ring 116, which is used to transmit traffic in the opposite direction.

Figure 2:
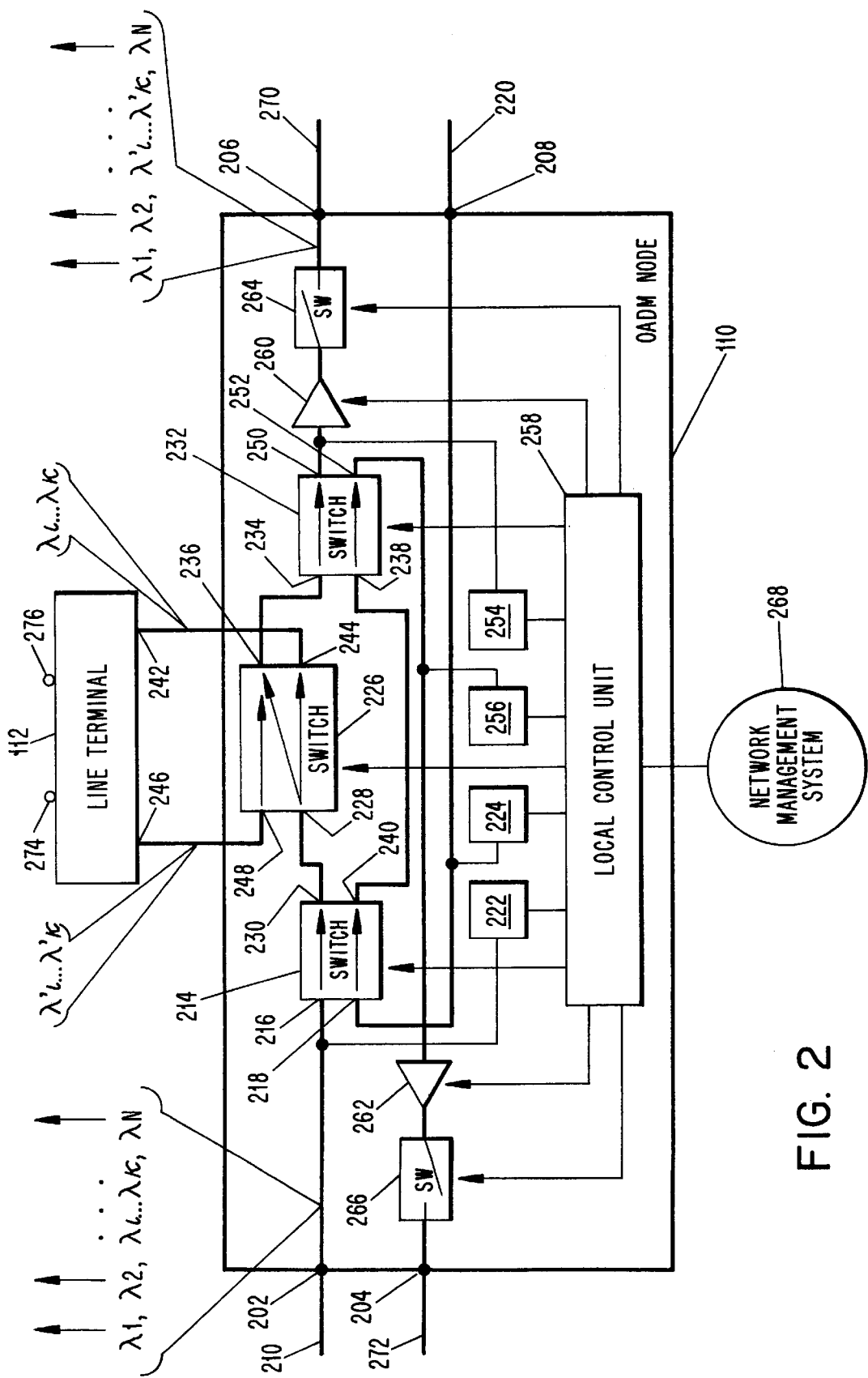
FIG. 2 shows a block diagram of an optical add/drop multiplexer node according to the invention.

FIG. 2 shows a block diagram of the add/drop multiplexer node 110 (OADM node) according to the invention. The node 110 has a working ring input 202, which is connected to a first light propagating means 210, i.e. an optical fiber. The working ring input 202 is connected to a first optical input 216 of a first optical switch 214, which is working in bar or cross states. A second light propagating means 220, which also is an optical fiber, is connected to a protection ring input 208 of the node. This protection ring input 208 is connected to a second optical input 218 of the first optical switch 214. A first optical output 230 of the first optical switch 214, which in bar state is coupled to the first optical input 216, is connected to a first optical input 228 of an optical channel-selective or wavelength-selective switch 226, which also works in bar or cross states. The first optical input 228 of the channel-selective switch 226 is in bar state coupled to a first optical output 244 of said channel-selective switch 226. This first output 244 is optically connected to an input 242 on a line terminal 112, which is associated with the node. An output 246 on the line terminal 112 is optically connected to a second input 248 of the channel-selective switch 226. This second input 248 is in bar state connected to a second optical output 236 of said channel-selective switch 226, which second output 236 is optically connected to a first input 234 of a second optical switch 232. The second optical switch 232 can operate in bar and cross states. A second input 238 of the second optical switch is connected to a second output 240 of the first optical switch 214, which second output 240 in bar state is connected to the second input 218.

A first output 250 of the second optical switch 232, which in bar state is coupled to the first input 234, is connected to an optical amplifier 260, which in turn is connected to a first optical breaking switch 264. This breaking switch 264 is connected to a working ring output 206 on the node. This working ring output 206 is connected to a third light propagating means 270. A second output 252 of the second optical switch 232, which in bar state is coupled to the second input 238, is connected to a second optical amplifier 262, which in turn is connected to a second optical breaking switch 266. The second breaking switch 266 is connected to a protection ring output 204 on the node, which is connected to a fourth light propagating means 272.

A first fault monitor 222 is optically connected to the first input 216 of the first optical switch 214, a second fault monitor 224 is optically coupled to the second input 218 of the first optical switch 214, a first light detection means or power detection monitor 254 is optically coupled to the first output 250 of the second optical switch 232 and a second light detection means or power detection monitor 256 is optically coupled to the second output 252 of the second optical switch 232. The fault monitors 222 and 224 as well as the power detection monitors 254 and 256 are electrically connected to a control means or local control unit 258, which controls the first and second optical switches 214 and 232, the wavelength-selective switch 226 and the first and second breaking switches 264 and 266. The local control unit 258 is finally connected to a network management means or system 268, which is located outside the node.

The function of the node 110 shown in FIG. 2 will now be described.

In working state, i.e. during normal operation of the network, a number of N channels containing traffic λ1, λ2, λι. . . λκ, λN, which channels are wavelength division multiplexed channels, are received in the node on the working ring input 202 and bar coupled through the first optical switch 214 to the wavelength-selective switch 226, where channels dedicated to the node are dropped to λι. . . λκ and added from λ'ι. . . λ'κ the line terminal 112. That is, traffic bound for the line terminal 112 is supplied over these channels and outbound traffic from said line terminal 112 is output over these channels. The dropping is achieved through bar coupling the channels to be dropped from the first input 228 to the first output 244 and the adding is achieved through bar coupling the wavelength channels received on the second input 248 to the second output 236. The line terminal 112 comprises an optical receiver connected to the input 242 via a filtering device and a transmitter connected to the output 246. The line terminal further comprises means for demodulating the modulated light (not shown) and means for converting the modulation to electrical signals (not shown) and furthermore means for conveying these electrical signals to intended receivers via electrical output 274. The line terminal 112 also receives, via electrical input 276, electrical signals containing information, which signals are to be sent to a receiver through the network. The electrical signals are converted, in the line terminal, to modulation of light with selected wavelength, which is sent to the transmitter for adding to the network.

Bypassing channels not to be dropped and added is achieved through at the same time selectively cross coupling these other wavelengths from the first input 228 to the second output 236. The added channels λ'ι. . . λ'κ plus the bypassed channels λ1, λ2, λN are bar coupled through the second optical switch 232 to the first amplifier 260 for amplification before they are supplied to the working ring output 206 for transport to the next node in the system. The bypassed channels are also equalized when passing through the wavelength-selective switch 226. The preferred number of channels N are four but more or fewer channels can just as well be used.

The local control unit 258 monitors the traffic using the first and second fault monitors 222 and 224 and when a fault occurs, e.g. a cable break or a node fault, and there is no functioning node between the add/drop multiplexer node 110 in question and the fault, the local control unit 258 changes the mode of operation for the first or second optical switch 214, 232 from bar to cross state and opens the first or second breaking switch 266, 264, which normally is closed, and then notifies the network management system 268 of this change. The choice of which optical switch and which breaking switch that is operated to change state and position is decided by the local control unit 258 based on which side of the node the fault occurs on. The node reroutes the traffic so that the protection ring also is used to convey traffic. The local control unit also controls the amplifiers 260 and 262 in order to test when a line has been repaired.

Figure 3:
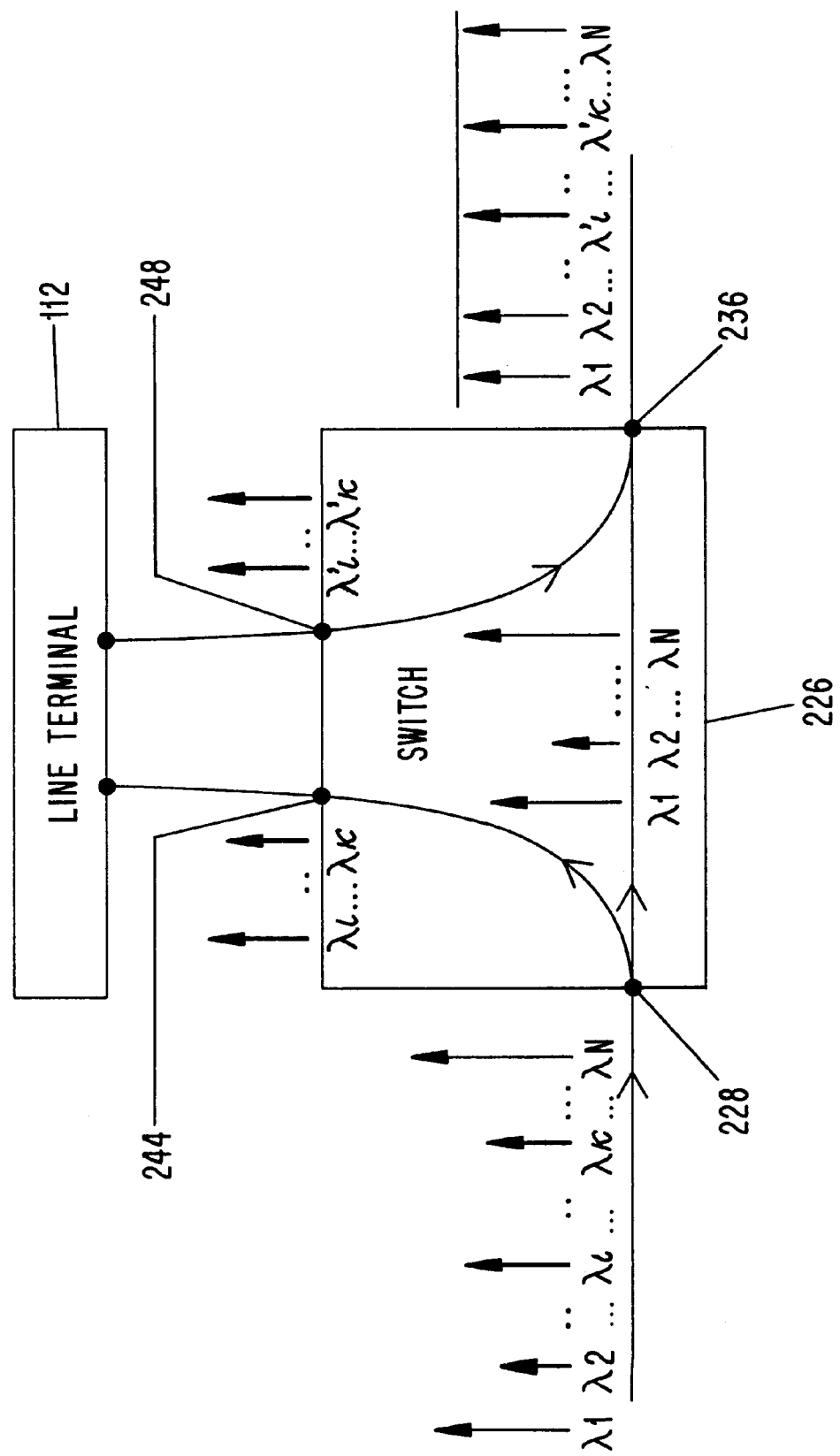
FIG. 3 shows a functional block of the channel-selective switch according to the invention.

The way the adding, dropping and equalization functions are performed in the wavelength-selective switch 226 is more clearly shown in FIG. 3. A number of different wavelength channels λ1, λ2, λι. . . λκ, λN are received on the first input 228 of the wavelength-selective switch 226. As can be seen these channels all have varying power levels. This is to some extent due to the characteristics of the optical fiber that is used to connect nodes with each other as well as to the characteristics of optical devices used and of amplification. The equalization, which is performed in order to avoid channel power unbalance accumulation through the network, is accomplished during the cross coupling of the bypassed channels.

In order to achieve the equalization the power detection monitors 254 and 256 (see FIG. 2) are used. In fact the power detection monitor 256 is only used when the protection inner ring is used for transmitting traffic in the node. And these two power detection monitors 254 and 256 could in fact in an alternative embodiment be reduced to only one power detection monitor connected between the second output 236 of the channel-selective switch 226 and the first input 234 of the second optical switch 232. The description will in the following be directed to the first power detection monitor 254, since both monitors work in identical fashion and this particular monitor 254 is the monitor that receives traffic in normal operation. In the preferred embodiment the power detection monitor 254 consists of a tap and a detector, usually a diode. The tap taps a small amount (about 5%) of the optical power supplied on the first output 250 of the second optical switch 232. The diode then detects this tapped power. The detected supplied optical power contains the channel power levels, which are detected using the pilot tone technique. Each optical carrier is amplitude modulated with a specific low frequency tone, the so called pilot tone, whose frequency is in the range of about 45–55 kHz. Each tone is down converted by means of the heterodyne technique, in order to reduce the noise level, and amplitude demodulated by an envelope detector. The level of the demodulated tone is linearly proportional to the optical power of the respective wavelength channel. A digital value of the demodulated tone for each channel is thereafter sent to the local control unit 258. The power detection monitors 254 and 256 can also be used to detect if traffic is present on the working ring only, on the protection ring only or on both the working and protection rings.

Figure 4:
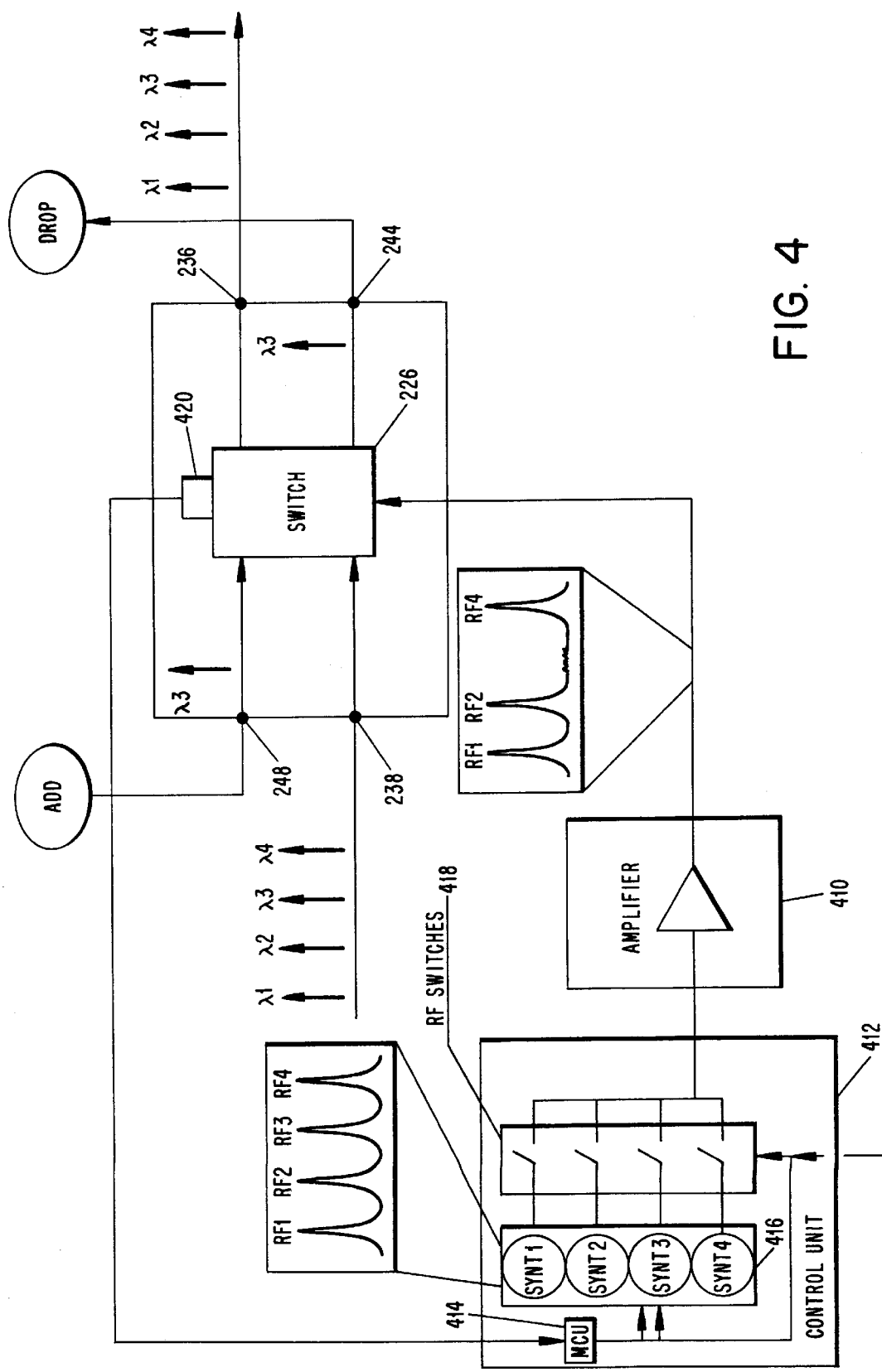
FIG. 4 shows a functional block diagram of the channel selective switch and part of the control means according to the invention.

The way the wavelength-selective switch 226 functions and is controlled will now be described with reference to FIG. 4. FIG. 4 schematically shows a part of the local control unit that is used to control the wavelength-selective switch 226 as well as said switch. The local control unit comprises a wavelength switch control unit 412, connected in series with an amplifier 410, which is connected to the wavelength-selective switch 226.

The wavelength-selective switch also contains a temperature sensor 420, which is connected to the wavelength switch control unit 412, and an analog temperature control loop. The wavelength switch control unit 412 contains a micro controller unit (MCU) 414 to which said temperature sensor 420 is connected in order to detect a temperature alarm. The MCU 414 controls a set of RF synthesizers 416, which in this embodiment are four (because four wavelength channels are used), more synthesizers and consequently more wavelength channels can however be used. The MCU 414 also controls a set of RF-switches 418, which also are four. This set of switches 418 can also be controlled by the network management system outside the node via the local control unit 258. Each synthesizer 416 is connected to a respective switch 418. The set of switches 418 is is connected to the amplifier 410, which in turn is connected to the optical wavelength-selective switch 226.

The operation of the wavelength-selective switch 226 will now be described. When the node is initialized for the first time, the MCU 414 takes control of the RF synthesizers 416 in order to generate a frequency ramp that is used to scan the optical bandwidth. A wavelength monitor (not shown) is connected to one of the outputs of the wavelength-selective switch 226. With this monitor the RF frequencies that cross couple the wavelength channels are detected. This initialization is performed because different RF frequencies cross couple the channels in different wavelength-selective switches. The RF frequencies RF1, RF2, RF3 and RF4 that cross couple this particular wavelength-selective switch 226 are then stored in the MCU 414. After the intialization one synthesizer 416 gets dedicated to each channel.

The network management system then sends, when the channel-selective switch 226 is to start to operate, information of which channels to be cross coupled to the local control unit 258, which then sends control information to the switches 41B in the wavelength switch control unit 412 (indicated with dashed lines). In this way a selected number of RF synthesizers 416 are connected to the wavelength-selective switch 226 for supplying the selected RF frequencies, in this example RF1, RF2 and RF4, to effect said cross coupling. These selected synthesizers 416 correspond to one channel each. The thus chosen channels $\lambda 1, \lambda 2$ and $\lambda 4$ are then cross coupled in the wavelength-selective switch 226.

The wavelength-selective switch 226 is based on $LiNbO_3$ acousto-optic technology and is of the multi passband type. It basically comprises an input polarization splitter, a waveguide of $LiNbO_3$ and an output polarization splitter/combiner. The selected combination of RF-tones are used to generate acousto-optic interaction within the $LiNbO_3$ waveguide in order to obtain polarization rotation of the particular combination of wavelengths. This wavelength-selective polarization rotation together with the polarization splitter/combiner accomplishes the cross coupling of the selected channels. The cross coupling is performed in such a way that each channel is separately filtered in such a way that neighboring channels and a lot of amplifier spontaneous emission is filtered away. This filtering rejects a lot of the amplifier spontaneous emission, which covers all of the optical spectrum, as well as alleviates the problem of crosstalk. Another problem that this cross coupling alleviates is the problem of polarization mode dispersion. The selection of channels to cross couple is always performed by the network management system or an operator.

A change of the switch setting could be done when for example one node is placed in a business area and another node is placed in a residential area and a lot of channels might be needed at the business area node in day time and a lot of channels might be needed at the residential area node in night time. In such a case an certain number of channels could be used in the business area in the day time and a few of these might later, at night, be used in the residential area.

The equalization of the bypassed channels will now be described. As has previously been mentioned the local control unit 258 receives digital information representing the relative power level of the channels. This information is stored in the MCU 414 and then used to control the power level of the respective selected RF synthesizer 416 for each channel.

The cross coupling function of the wavelength-selective switch is such that the power of a chosen wavelength is switched in cross state proportionally to the relative RF power. In that way a controlled attenuation of the wavelengths having the highest power level can be obtained. The cross coupled wavelengths will thus have the same power levels. The added wavelengths are generated in the line terminal with the same power level as the above equalized level. The rest of the power of the cross coupled wavelength is bar coupled to the receiver of the line terminal. The line terminal thus receives some noise and therefore the line terminal includes, as previously mentioned, a filtering device between its receiver and its input in order to to separate the dropped channels and filter away the bar coupled part of the channels to be bypassed as well as other noise.

The local control unit can detect temperature alarms via the MCU 414, senses the temperature of the wavelength-selective switch with the temperature sensor. The local control unit can also send an alarm to the network management system if the temperature should be too high.

What has been described here is just one embodiment of the present invention. It can be varied in many ways. Several types of optical amplifiers can be used, as well as different types of optical filters. The exact placing of the components can be varied. The network structure can be varied as well and the node according to the invention is not limited to this structure with a working ring and a protection ring or the components associated with that structure.

What is claimed is:

1. Method of dropping and adding channels to and from a line terminal that is connected to an optical add/drop-multiplexer node in order to communicate between said add/drop multiplexer node and at least one first and one second other optical node, comprising the steps of:

providing a channel selective switch which is operable in bar and cross states, receiving, in the optical add/drop-multiplexer node, at least two optical multiplexed channels from the first other optical node, selecting a predetermined number of channels to be dropped to, and added from, the line terminal, dropping and adding the selected predetermined number of channels, passing non-selected channels through the optical add/drop-multiplexer node to said second other optical node, wherein the step of passing further comprises cross coupling said non-selected channels, which are received from the first other optical node, from a first optical input of the channel selective switch to a second optical output of said channel selective switch and equalizing power levels of the non-selected channels, from which second optical output the non-selected channels are supplied to the second other optical node.

2. Method according to claim 1, further comprising the step of:

bar coupling channels that are selected to be dropped to the line terminal from the first optical input of the channel selective switch to a first optical output of the switch, from which first optical output the selected channels are supplied to the line terminal.

3. Method according to claim 2, wherein the step of bar coupling the channels selected to be added from the line terminal comprises supplying said selected channels to the channel selective switch with approximately the same power level as the equalized channels.

4. Method according to claim 3, further comprising the step of:

measuring the power levels of the non-selected channels prior to equalization.

5. Method according to claim 2, wherein the step of equalizing comprises partially cross coupling non-selected channels and the step of dropping comprises filtering away non-switched parts of non-selected channels.

6. Method according to claim 1, further comprising the step of:

bar coupling channels, which are selected to be added from the line terminal, from a second input of the channel selective switch, on which second input the selected channels are received from said line terminal, to the second output of the channel selective switch.

7. Method according to claim 1, further comprising the step of:

amplifying the added and not selected channels.

8. Optical add/drop multiplexer node for communication with other optical nodes by receiving and transmitting light via light propagation means, which optical add/drop multiplexer node comprises:

an adding and dropping device, which is operable in bar and cross states and has:
  a first input connected to a first input of the optical add/drop multiplexer node,
  a second input connected to an output on a line terminal that is associated with the optical add/drop multiplexer node,
  a first output, which is bar coupled to the first input and connected to an input on the line terminal, and
  a second output, which is bar coupled to the second input and connected to a first output of the optical add/drop multiplexer node,
wherein the optical adding and dropping device is a channel selective switch, which is arranged to cross couple, at least partially, a predetermined number of channels that are received on the first input to the second output, to equalize power levels of the cross coupled channels and to bar couple the other channels received on the first input to the first output.

9. Optical add/drop multiplexer node according to claim 8, wherein said channel selected switch has a control input for the reception of control information concerning selection of channels to be cross coupled in said channel selective switch, and in that the channel selective switch is arranged to perform said cross coupling based on said control information.

10. Optical add/drop multiplexer node according to claim 8, wherein a control means is provided in the optical add/drop multiplexer node, which control means has an input for receiving control information from a network management means outside the optical add/drop multiplexer node and is connected to the channel selective switch for sending control information to said channel selective switch in order to control said cross coupling of channels.

11. Optical add/drop multiplexer node according to claim 10, wherein a light detection means is optically connected between the second output of the channel selective switch and the output of the optical add/drop multiplexer node in order to detect channels power variations, which light detection means is also connected to said control means, wherein the control means is further arranged to send, in said control information, information concerning controlling equalization of the channels that are cross coupled in said channel selective switch.

12. Optical add/drop multiplexer node according to claim 11, wherein an optical amplifier is connected between the light detection means and the output of the optical add/drop multiplexer node.

13. Optical add/drop multiplexer node according to claim 10, wherein a temperature sensing means is connected between the channel selective switch and the control means.

14. Optical add/drop multiplexer node according to claim 10, wherein the channel selective switch is a wavelength selective switch for cross coupling wavelength division multiplexed channels and that said control means comprises RF signal generating means for generating RF-signals that control said cross coupling in the wavelength selective switch.

15. Optical add/drop multiplexer node according to claim 10, wherein said line terminal comprises an optical receiver, which is connected to the line terminal input via a filtering device, and a transmitter, which is connected to the line terminal output, wherein said first and second filtering devices are arranged, through control by said control means, to filter away received channels not intended for the line terminal.

16. Optical network comprising at least three optical nodes that are connected to each other by light propagation means, wherein said network comprises at least one add/drop multiplexer node, which add/drop multiplexer node comprises an adding and dropping device, which is operable in bar and cross states, and has:
  a first input connected to a first input of the add/drop multiplexer node,
  a second input connected to an output on a line terminal that is associated with the add/drop multiplexer node,
  a first output, which is bar coupled to the first input and connected to an input on the line terminal, and
  a second output, which is bar coupled to the second input and connected to a first output of the node,
wherein said optical adding and dropping device is a channel selective switch, which is arranged to cross couple, at least partially, a predetermined number of channels that are received on the first input to the second output to equalize the power levels of the cross coupled channels and to bar couple the other channels received on the first input to the first output.

* * * * *